(12) United States Patent
Vempada et al.

(10) Patent No.: US 10,134,423 B2
(45) Date of Patent: Nov. 20, 2018

(54) SYSTEM AND METHOD TO PROVIDE CLASSIFICATION OF NOISE DATA OF HUMAN CROWD

(71) Applicant: Tata Consultancy Services Limited, Mumbai (IN)

(72) Inventors: Ramu Reddy Vempada, Kolkata (IN); Aniruddha Sinha, Kolkata (IN); Guruprasad Seshadri, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/101,817

(22) PCT Filed: Dec. 3, 2014

(86) PCT No.: PCT/IB2014/066538
§ 371 (c)(1),
(2) Date: Jun. 3, 2016

(87) PCT Pub. No.: WO2015/083091
PCT Pub. Date: Jun. 11, 2015

(65) Prior Publication Data
US 2016/0307582 A1    Oct. 20, 2016

(30) Foreign Application Priority Data

Dec. 6, 2013    (IN) .......................... 3833/MUM/2013

(51) Int. Cl.
*G10L 25/30*    (2013.01)
*G10L 21/0216*    (2013.01)
(Continued)

(52) U.S. Cl.
CPC .............. *G10L 25/51* (2013.01); *G10L 25/09* (2013.01); *G10L 25/24* (2013.01); *G06K 9/6234* (2013.01)

(58) Field of Classification Search
CPC ......... G10L 15/16; G10L 15/20; G10L 21/02; G10L 21/0205; G10L 21/0216;
(Continued)

(56) References Cited

U.S. PATENT DOCUMENTS 5,970,447 A    10/1999  Ireton
6,633,842 B1   10/2003  Gong
(Continued)

OTHER PUBLICATIONS

International Search Report dated Jun. 8, 2015, in counterpart International Application No. PCT/IB2014/066538 issued by the U.S. Patent & Trademark Office; 2 pages.

*Primary Examiner* — Martin Lerner
(74) *Attorney, Agent, or Firm* — Finnegan, Henderson, Farabow, Garrett & Dunner LLP (57) ABSTRACT

System(s) and method(s) for classifying noise data of human crowd are disclosed. Noise data is captured from one or more sources and features are extracted by using computation techniques. The features comprise spectral domain features and time domain features. Classification models are developed by using each of the spectral domain features and the time domain features. Discriminative information with respect to the noise data is extracted by using the classification models. A performance matrix is computed for each of the classification model. The performance matrix comprises classified noise elements with respect to the noise data. Each classified noise element is associated with a classification performance score with respect to a spectral domain feature, a time domain feature, and fusion of features and scores. The classified noise elements provide the classification of the noise data.

12 Claims, 8 Drawing Sheets

(51) Int. Cl.
*G10L 25/03* (2013.01)
*G10L 25/51* (2013.01)
*G10L 25/24* (2013.01)
*G10L 25/09* (2013.01)
*G06K 9/62* (2006.01)

(58) Field of Classification Search
CPC ............. G10L 21/0224; G10L 21/0232; G10L 21/0308; G10L 25/09; G10L 25/24; G10L 25/30; G10L 25/51; G10L 25/03; G06K 9/6228; G06K 9/6234
USPC ............... 704/226, 227, 228, 232, 233, 236; 700/94; 706/12, 20
See application file for complete search history.

(56) References Cited

U.S. PATENT DOCUMENTS

| | | | |
|---|---|---|---|
| 8,428,948 | B1 | 4/2013 | Paniconi |
| 8,812,310 | B2* | 8/2014 | Muhammad ............ G10L 25/00 704/205 |
| 2005/0027528 | A1* | 2/2005 | Yantorno ................ G10L 17/02 704/246 |
| 2006/0025989 | A1 | 2/2006 | Mesgarani et al. |
| 2008/0027887 | A1* | 1/2008 | Barbu ................. G06K 9/6256 706/25 |
| 2008/0300700 | A1* | 12/2008 | Hammer ................ H04R 29/00 381/56 |
| 2009/0012638 | A1* | 1/2009 | Lou ........................ G11B 27/28 700/94 |
| 2009/0103896 | A1 | 4/2009 | Harrington |
| 2010/0217584 | A1 | 8/2010 | Hirose et al. |
| 2010/0257129 | A1* | 10/2010 | Lyon ....................... G10L 25/48 706/12 |
| 2010/0317391 | A1* | 12/2010 | Mody .................. H04L 63/1458 455/512 |
| 2012/0022863 | A1* | 1/2012 | Cho ........................ G10L 15/14 704/233 |
| 2012/0022864 | A1* | 1/2012 | Leman ................... G10L 15/20 704/233 |
| 2012/0290526 | A1* | 11/2012 | Gupta ...................... G06N 7/00 706/52 |
| 2013/0138437 | A1* | 5/2013 | Cho ........................ G10L 15/20 704/233 |
| 2013/0202120 | A1 | 8/2013 | Bickel et al. |
| 2014/0058982 | A1* | 2/2014 | Loui ....................... G10L 25/51 706/12 |
| 2014/0180674 | A1* | 6/2014 | Neuhauser ............... G10L 25/81 704/9 |
| 2014/0369561 | A1* | 12/2014 | Gupta ................ G06K 9/00362 382/103 |
| 2015/0016667 | A1* | 1/2015 | Algreatly ............ G06K 9/00201 382/103 |
| 2015/0058004 | A1* | 2/2015 | Dimitriadis ............. G10L 25/78 704/233 |
| 2015/0110277 | A1* | 4/2015 | Pidgeon .................. H04R 3/00 381/56 |

\* cited by examiner

SYSTEM AND METHOD TO PROVIDE CLASSIFICATION OF NOISE DATA OF HUMAN CROWD

PRIORITY CLAIM

This application is a U.S. National Stage Filing under 35 U.S.C. § 371 and claims priority from international Application No. PCT/IB2014,1066538, filed on Dec. 3, 2014, which application claims priority under 35 U.S.C. § 119 from India Application No. 3833lMUM/2013, filed on Dec. 6, 2013. The entire contents of the aforementioned application are incorporated herein by reference.

TECHNICAL FIELD

The present disclosure in general relates to a method and system to provide data classification. More particularly, the present disclosure relates to classification of noise data of human crowd.

BACKGROUND

Demand for automatic surveillance system has increased drastically at public places for variety of reasons. Most of the available surveillance systems are based on video information captured from surveillance cameras. However, it is difficult to track the abnormal events from video information because visual analysis has many practical limitations. The visual analysis has practical limitations such as deployment of cameras and external environmental lighting conditions. Video information based surveillance system fails due to abnormal weather conditions such as low lighting effects, fog and darkness etc.

Further, in order to overcome the shortcomings of visual analysis in surveillance system, audio based surveillance systems are developed. Audio based surveillance systems are developed to detect the events like pitch range, gunshot, glass breaking, fighting, dog barking, vocal and non-vocal events etc. However, the audio based surveillance systems fails in detecting the above said events in noisy conditions.

There are a variety of audio and video based surveillance systems proposed in the art using different features to detect any abnormal events or situations in public places. It was observed in the prior art that combination of different features did not result in improved classification. On the contrary, it is disclosed in the prior art that use of combination of features give reduction in performance of the surveillance systems.

SUMMARY

This summary is provided to introduce aspects related to system(s) and method(s) to provide classification of noise data of human crowd and the aspects are further described below in the detailed description. This summary is not intended to identify essential features of the claimed subject matter nor is it intended for use in determining or limiting the scope of the claimed subject matter.

The present disclosure relates to a method for classifying noise data of human crowd. The method comprises capturing the noise data from one or more sources. The noise data is associated with plurality of speech signals. The method further comprises extracting features from the noise data by using one or more computation techniques, the features comprises spectral domain features and time domain features and developing classification models by using each of the spectral domain features and the time domain features. The method further comprises extracting discriminative information with respect to the noise data by using the classification models; the discriminative information recognizes the plurality of speech signals and computing a performance matrix for each of the classification models by using the discriminative information. The performance matrix comprises one or more classified noise elements with respect to the noise data. Each classified noise element is associated with a classification performance score with respect to a spectral domain feature and a time domain feature and the classified noise elements provides categorization of the noise data thereby providing the classification of the noise data. classified noise elements provides categorization of the noise data thereby providing the classification of the noise data.

The present disclosure also relates to a system for classifying noise data of human crowd. The system comprises a processor and a memory coupled to the processor. The processor is capable of executing a plurality of modules stored in the memory. The plurality of modules comprises a capturing module configured to capture the noise data from one or more sources. The noise data is associated with plurality of speech signals. The plurality of modules further comprises a first extraction module configured to extract features from the noise data by using one or more computation techniques, the features comprise spectral domain features and time domain features and a development module configured to develop classification models by using each of the spectral domain features and the time domain features. The plurality of modules further comprise a second extraction module configured to extract a discriminative information with respect to the noise data by using the classification models, the discriminative information recognizes the plurality of speech signals and a computation module configured to compute a performance matrix for each of the classification models by using the discriminative information. The performance matrix comprises one or more classified noise elements with respect to the noise data. Each classified noise element is associated with a classification performance score with respect to a spectral domain feature and a t e domain feature, and the classified noise elements provides categorization of the noise data thereby providing the classification of the noise data.

The present disclosure also relates to a non-transitory computer readable medium embodying a program executable in a computing device for classifying noise data of human crowd. The program comprises a program code for capturing the noise data from one or more sources; the noise data is associated with plurality of speech signals and a program code for extracting features from the noise data by using one or more computation techniques. The features comprise spectral domain features and time domain features. The program further comprises a program code for developing classification models by using each of the spectral domain features and the time domain features and a program code for extracting discriminative information with respect to the noise data by using the classification models. The discriminative information recognizes the plurality of speech signals. The program further comprises a program code for computing a performance matrix for each of the classification models by using the discriminative information. The performance matrix comprises one or more classified noise elements with respect to the noise data. Each classified noise element is associated with a classification performance score with respect to a spectral domain feature and a time domain feature and the classified noise elements provides categorization of the noise data thereby providing the classification of the noise data.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

While aspects of described system(s) and method(s) to provide classification of noise data of human crowd is shown may be implemented in any number of different computing systems, environments, and/or configurations, the embodiments are described in the context of the following exemplary system.

Figure 1:
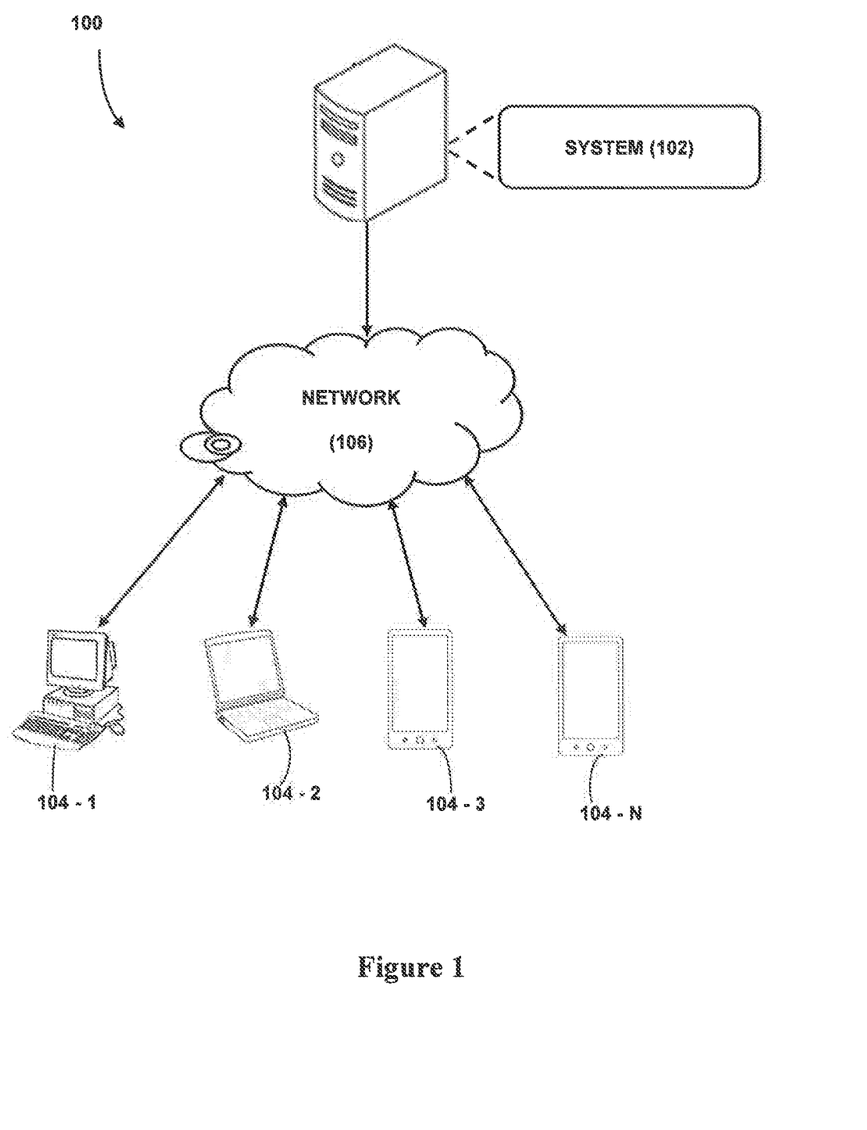
FIG. 1 illustrates a network implementation of a system to provide classification of noise data of human crowd is shown, in accordance with an embodiment of the present subject matter.

Referring now to FIG. 1, a network implementation 100 of system 102 to provide classification of noise data of human crowd is shown. The classification of noise data (crowd noise) is further used in a surveillance system. Noise data from one or more sources is collected. One or more type of feature is extracted from the noise data. The features comprise spectral domain features (or simply spectral features) and time domain features (or simply time features). The noise data classification is used to detect abnormal event based on change in crowd noise. The crowd noise classification is obtained by fusion of spectral and time domain features. The system and method uses features like Mel-Frequency Cepstral Coefficients, Short-Time Energy, Zero Cross Rating in addition to the Spectral Flatness Measure for crowd noise classification. The system and method uses feature such as spectral flatness measure to improve the performance accuracy of the system and method. Performance of system and method for classification of noise data (crowd noise classification) is improved by fusing the features at score levels using different weights. The system and method is provided with collection of crowd noise at different environment and further to extract features in order to discriminate variety of noises. Further, the system and method comprises training and machine learning to recognize the types of crowd noise.

Although the present subject matter is explained considering that the system 102 is implemented as an application on a server, it may be understood that the system 102 may also be implemented in a variety of computing systems, such as a laptop computer, a desktop computer, a notebook, a workstation, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP). Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
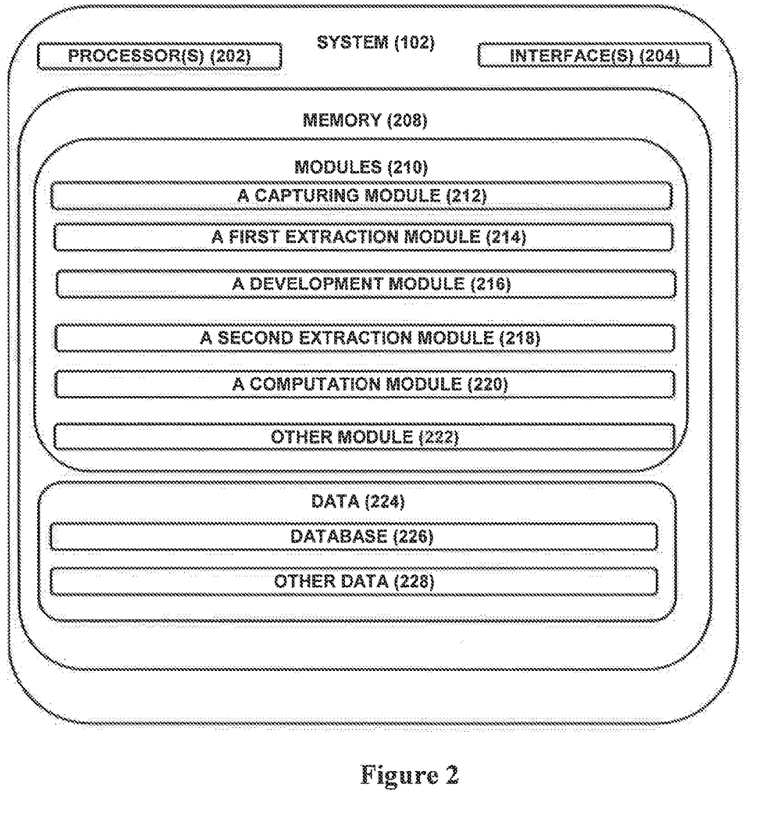
FIG. 2 illustrates the system to provide classification of noise data is shown of human crowd, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 224.

The modules 210 include routines, programs, objects, components, data structures, etc., which perform particular tasks, functions or implement particular abstract data types. In one implementation, the modules 210 may include a capturing module 212, a first extraction module 214, a development module 216, a second extraction module 218, and a computation module 220. Other modules 222 may include programs or coded instructions that supplement applications and functions of the system 102.

The data 224, amongst other things, serves as a repository for storing data processed, received, and generated by one or more of the modules 222. The data 224 may also include a database 226, and other data 228. The other data 228 may include data generated as a result of the execution of one or more modules in the other module 222.

The present disclosure relates to system(s) and method(s) for classifying noise data of human crowd. The noise data so classified is further used in a surveillance system. The surveillance system having crowd noise classification uses crowd noise as a source. Abnormal events may be detected based on a change in the crowd noise. The change in crowd noise is extracted as discriminative information. The system and method for crowd noise classification configured to classify the crowd noise is disclosed.

The capturing module 212 captures noise from one or more sources. The noise data is associated with plurality of speech signals. The one or more sources comprise railway stations, book fairs or a combination. The noise data is collected due to contribution of one or more events at the one or more sources. The one or more event comprises at least one of a speech of people, a movement of people, announcements and horn sounds.

By way of an example, crowd noise (or noise data) is captured using microphones of mobile phones. Mobile phone based audio sensors are used to estimate people density from noise characteristics. Mobile phones equipped with normal microphones are capable of capturing ambient noise and sounds in ubiquitous manner. Abnormal events based on the crowd noise may be distinguished. In a general situation, behavior of the crowd is normal and the discussion among the crowd may be treated as neutral. But if any abnormal event happens, there is likely to be a change in intensity level and shouting or screaming may happen.

The first extraction module 214 is configured to extract features from the noise data by using computation techniques. The features comprise spectral domain features and time domain features. The system 102 also preprocesses the noise data for removal of pauses and unwanted signals.

The first extraction module 214 is configured for examination of Mel-frequency Cepstral Coefficients (MFCCs) and Spectral Flatness Measure (SFM) for representing the spectral information and Short-Time frame Energy (STE) and Zero-Crossing Rate (ZCR) for representing the time domain information.

Figure 3:
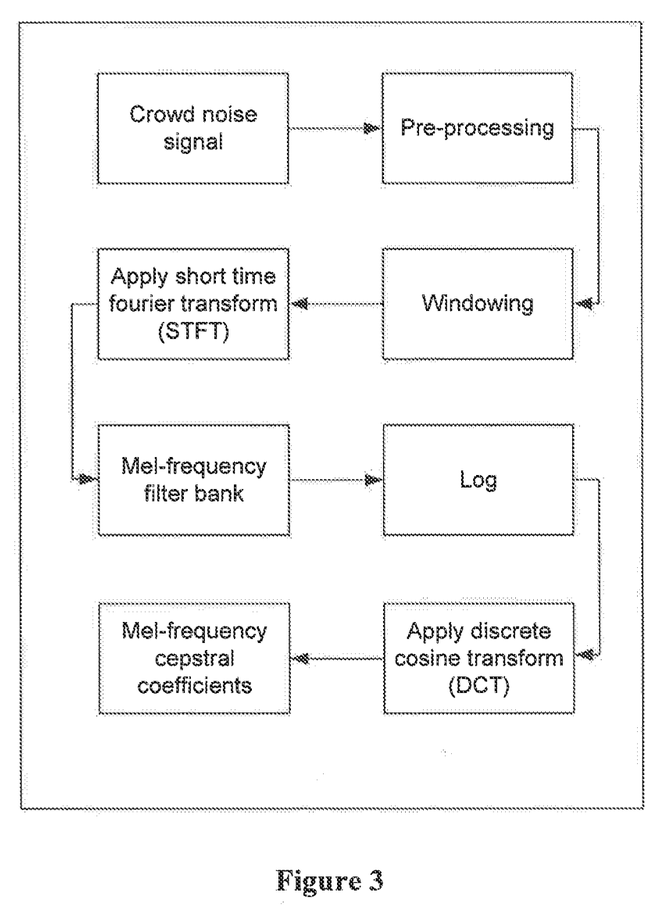
FIG. 3 illustrates steps to derive Mel-Frequency Cepstral Coefficients (MFCCs) from the crowd noise, in accordance with an embodiment of the present disclosure.

According to an embodiment of the present disclosure, the computation technique for spectral feature extraction is described. The characteristic of crowd noise is the result of incoherent addition of several speech signals. The spectral features comprise MFCCs and SFM for representing the spectral information. MFCCs and SFM features are extracted to capture the discriminated spectral information of each crowd. Referring to FIG. 3, the steps to derive MFCCs from the crowd noise are described herein. In the first step, pre-emphasizing of the signal is carried out. In next step, the pre-emphasized signal is divided into sequence of frames with a frame size of 20 ms and a shift of 10 ms. Hamming window is then applied over each of the frames. Further, Discrete Fourier Transform (DFT) is applied for computation of the magnitude spectrum for each windowed frame. In the next step, the DFT signal is passed through mel filter bank to obtain mel spectrum. For deriving the MFCCs, 24 filter bands are used. The desired MFCCs are then derived by applying Discrete Cosine Transform (DCT) to the log mel frequency coefficients (log mel spectrum). The block diagram representation of the above mentioned steps for extracting the MFCCs from the crowd noise signal is shown in FIG. 3. By way of an example, 39 dimensional spectral features are used representing 13 MFCCs, 13 delta MFCCs and 13 delta-delta MFCCs, respectively.

The first extraction module 214 is further configured to extract SFM as an important measure for classifying the crowd noise. SFM estimates the flatness of a frequency spectrum. It is the ratio between geometric mean of DFT coefficients and their arithmetic mean. If $S(\Omega, t)$ is the windowed power spectrum of a signal s at time t and frequency $\Omega$, its spectral flatness measure is given by following equation (1):

$$\text{SFM}[S(t)] = (\Pi\omega = 0^{\Omega-1} S(\omega, t))^{1/\Omega} \qquad \text{Equation (1)}$$

Figure 4:
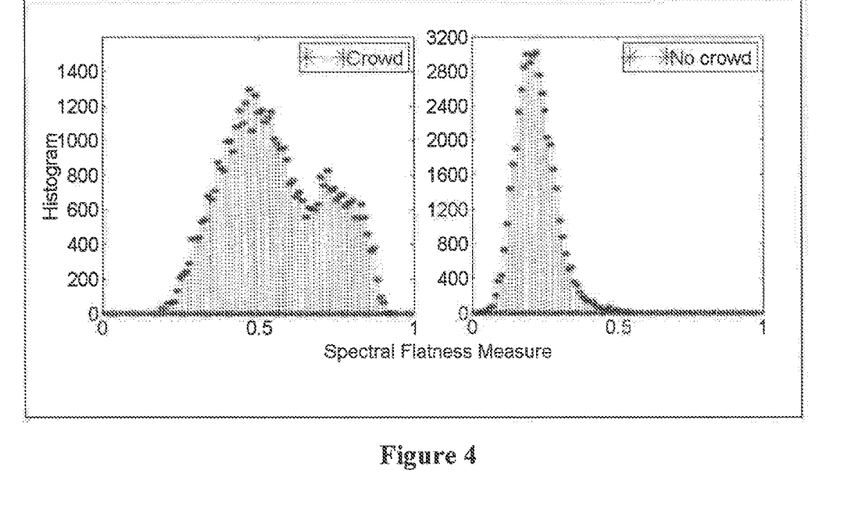
FIG. 4 illustrates a distribution plot of Spectral Flatness Measure (SFM) for crowd and no crowd, in accordance with an embodiment of the present disclosure.

The SFM for pure noisy signal will tend to 1 whereas for pure tone is 0. SFM is used for discrimination of crowd noise. SFM for high crowd tends to be more as compared to no crowd. The distribution plots of SFM for crowd and no crowd is given in FIG. 4. By way of an example, as shown in FIG. 4, SFM is calculated for every 20 ms of signal with shift of 10 ms.

According to an embodiment of the present disclosure, the computation technique applied by the first extraction module 214 for time domain feature extraction is described. The time domain features used for discriminating the crowd noise are STE and ZCR. The intuition to use STEs and ZCRs is based on the observation that discrimination between the two types of crowd noise may be captured from the amplitudes of crowd noise and zero-crossing rates. Here, STE is defined as the average of the square of the sample values in a short window (20-30 ms). Mathematical formula used to calculate STE is given as follows:

$$E(n) = 1/N \Sigma^{N-1}_{m=0}[w(m) \times (n-m)]^2 \qquad \text{Equation (2)}$$

In Equation (2) w(m) is a suitable window function of length N. The STEs are then normalized between 0 and 1. Zero-crossing rate is defined as the number of times the signal crosses (sign changes) the zero axis i,e. either from negative to positive or vice versa. Mathematical formulation used to calculate the ZCR is given as follows:

$$\text{ZCR}[n] = 1/2[\Sigma^{N-1}_{i=0}|\text{sign}[s_n(i)] - \text{sign}[s_n(i-1)]|]f_s/N \qquad \text{Equation (3)}$$

Figure 5:
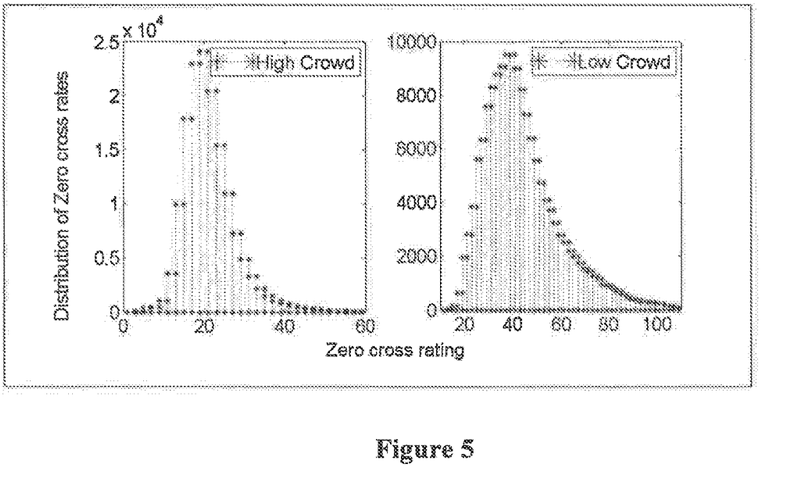
FIG. 5 illustrates a distribution plot of Zero Cross Rating (ZCR) for crowd and no crowd, in accordance with an embodiment of the present disclosure.

In equation (3), $f_s$ is the sampling rate of the signal. From the crowd noise signals, it is observed that the zero-crossing rates are different for the two types of crowd noise. By way of an example, the features extracted STEs and ZCRs from the crowd noise samples are of 8 kHz sampling frequency using a Hamming window of size 20 ms and shift of 10 ms. The average ZCR for crowd and no crowd is observed as 21 and 44, over the 20 ms frame. The distribution plot of ZCR for crowd and no crowd is given in FIG. 5.

The development module 216 is configured to develop classification models by using each of the spectral domain features and the time domain features extracted by the first extraction module 214. The system 102 uses Support Vector Machine (SVM) training methodology for developing the classification models and for discriminating the crowd noise. SVM classification is a type of supervised learning. The classification task involves training and testing of noise data. The noise data consist of some data instances. In the training set, each data instance contains one target class label and many attributes. The SVM classification is used to develop classification models for both the spectral domain features and the time domain features and combination of the spectral and the time domain features. The SVM model (classification model) predicts target class label of data instances in the testing set, given only the attributes. The SVM models for different crowd noise are developed by the development module 216 as-one against-rest principle. The SVM model for the specific crowd noise is developed, by using feature vectors derived from the desired crowd noise signal as positive examples and the feature vectors derived from the other crowd noise as negative examples. By way of an example, Radial basis function (RBF) kernel, unlike linear kernel, is used to map the data points to higher dimensional space as RBF kernel may handle the case where the relation between the class labels and attributes is nonlinear. The intuition to use RBF kernel function is due to RBF kernel function's universal approximation properties. Also, RBF kernel offers good generalization as well as good performance in solving practical problems. The basic architecture of the system 102 for crowd noise classification using SVMs is shown in FIG. 6.

Figure 6:
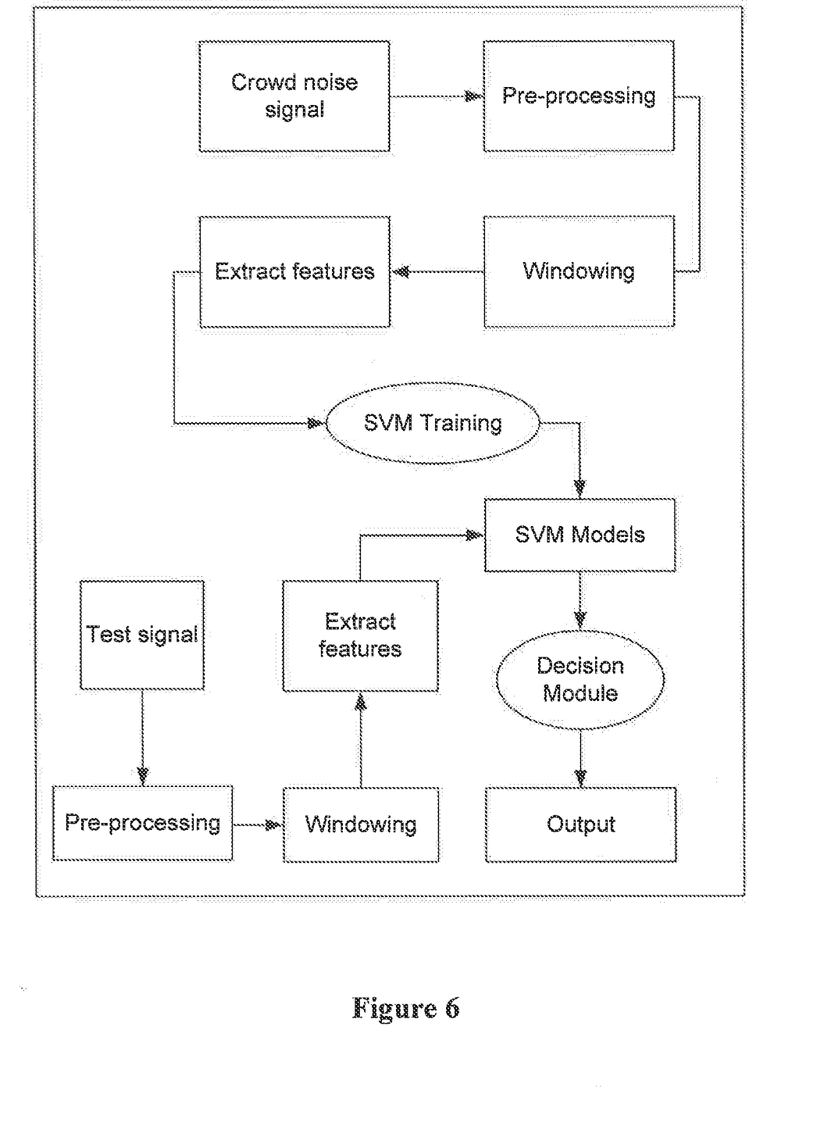
FIG. 6 illustrates a system for crowd noise classification, in accordance with an embodiment of the present disclosure

Still referring to FIG. 6, according to an exemplary embodiment of the present disclosure, the working of the development module 216 using the SVM training is described. Here pre-categorized data i.e. crowd data and the no crowd data is used from the noise data to check the working efficiency of the model. The working of SVM model (or the classification model) is tested by checking in terms of percentage of how much pre-categorized crowd data and no crowd data is classified. As an input to the development module 216, 2000 sec of audio data is used after preprocessing and annotation of collected crowd noise signals. Out of 2000 sec of audio data, ratio may comprise that 1000 sec is crowd and 1000 sec is no crowd noise signal duration. In order to build the SVM models for each type of crowd noise, 800 sec of each type of crowd noise is used for training the models and remaining 200 sec is used for testing the models. In order to develop the SVM model for the specific type of crowd noise, feature vectors are derived for each crowd noise.

Each feature vector represents 100 ms of data. Feature vector of 100 ms is constructed by concatenating the features extracted from 20 ms with a shift of 10 ms. Hence, for each crowd noise 8000 samples or feature vectors (800*1000/100) are used for training the SVM. After developing SVM models for each crowd noise type, the performance of the system for crowd noise classification is evaluated by using remaining 2000 test samples or feature vectors (200*1000/100) of each type of crowd noise as input to variety of SVM models called as SVM crowd noise models.

The second extraction module 218 is configured to extract discriminative information with respect to the noise data by using the SVM classification models. The discriminative information recognizes the plurality of speech signals with respect to feature vectors.

The output (discriminative information) of the each SVM classification model is given to decision logic (decision module in FIG. 6). The decision logic determines the crowd noise type based on the highest score among the three evidences provided by the SVM classification model. Initially the capability of individual spectral and time domain parameters is analyzed for discriminating the crowd noise. Later, the feature and score level fusion techniques for improving the performance of the system is analyzed. System models for crowd noise classification of Classification models developed by development module 216 are developed in three types as follows. System-I as Crowd noise classification system using spectral (MFCC+SFM) features. System-II as Crowd noise classification system using time domain (STE+ZCR) features and System-III (Fused classification model) as Crowd noise classification system using combination or fusion of spectral and time domain features, The computing module 220 is configured to compute a performance matrix for each of the classification models (System-I, System-II and System-III) by using the discriminative information. The performance matrix is an output of the computing module 220. The performance matrix comprises one or more classified noise elements with respect to the noise data. Each classified noise element is associated with a classification performance score with respect to a spectral domain feature and a time domain feature. The classified noise elements provide categorization of the noise data thereby providing the classification of the noise data. The one or more categorized noise element comprises no crowd noise data and crowd noise data. The no crowd noise data comprises noise data where people are less than three and the crowd noise data comprises noise data where people are more than three.

Diagonal elements of the performance matrix represent the correct classification performance of the crowd noise. Non-diagonal elements indicate the performance of misclassification of the crowd noise. The detail of the recognition performance (in the form of performance matrix) using different features and classification models is described. The recognition performance using spectral features is described. The classification performance of the System-I (SVM mod& using spectral domain features) developed using MFCCs and SFM is shown in Table 1. Columns 2-3 indicate the performance of the system-I. From the confusion matrix (performance matrix) shown in Table 1, it is observed that the average recognition performance of the system-I developed using MFCCs and SFM is 91.35% and the classification performances of crowd and no crowd are 89.15% and 93.55% respectively.

TABLE 1

| | Average classification performance (%) using spectral features (MFCC and SFM) | |
|---|---|---|
| | Crowd | No crowd |
| Crowd | 89.15 | 10.85 |
| No Crowd | 6.45 | 93.55 |

The recognition performance of the system for crowd noise classification using time domain features is described. The classification performance of the system-II (SVM model using time domain features) developed using STE and ZCR is shown in Table 2. Columns 2-3 indicate the performance of the system-II. From Table 2, it is observed that the average recognition performance of the system-II developed using MFCCs and SFM is 84.65% and the classification performances of crowd and no crowd are 85.70% and 83.60% respectively.

TABLE 2

| | Average classification performance (%) using time domain features (STE and ZCR) | |
|---|---|---|
| | Crowd | No crowd |
| Crowd | 85.70 | 14.30 |
| No Crowd | 16.40 | 83.60 |

Based on the performance results of the system 102 for crowd noise classification, it is observed that both spectral (MFCC+SFM) and time domain (STE and ZCR) features have discrimination information related to crowd noise. It is also observed that the no crowd noise is well discriminated compared to crowd noise using spectral information, whereas using time domain information, crowd noise shows better performance compared to no crowd noise. Both spectral and time domain information are complementary in nature, and can help in discriminating the crowd noise. Hence, for enhancing the performance of the system 102 for crowd noise classification, fusion techniques may be used at feature and score levels.

The fusion of features and scores used in the system 102 for crowd noise classification is described.

The fusion at feature level is performed by concatenation of the individual features i.e., spectral and time domain features. The concatenated feature vectors are used to develop a classification model, which is referred to as system-III (Fused classification model or SVM model using combination or fusion of spectral domain features and the time domain features). The performance of the system-III using feature level fusion in terms of feature fused performance matrix is given in Table-3. The average classification performance using feature level fusion is observed to be 93.10%.

TABLE 3

| | Average classification performance (%) using feature level fusion | |
|---|---|---|
| | Crowd | No crowd |
| Crowd | 90.35 | 9.65 |
| No Crowd | 4.15 | 95.85 |

The system 102 further fuses the performance score of the one or more classifying elements with respect to each of the spectral domain features and the time domain features by using the System-I and the System-II to obtain fused scores. The fusion results in multiple combinations of scores of the spectral domain features and the time domain features with respect to the one or more classifying elements. Fused performance matrix is then computed by the computation module 220 by using the fused scores. The score fused performance matrix comprises one or more classifying elements of the noise data with respect to the multiple combinations.

The score level fusion is performed by summing the weighted confidence scores (evidences) derived from the system-I and system-II. The weighting rule for combining the confidence scores of individual modalities is as follows:

$$C^m = 1/m \Sigma_{m1=1} W_i C_i \quad \text{Equation (4)}$$

Figure 7:
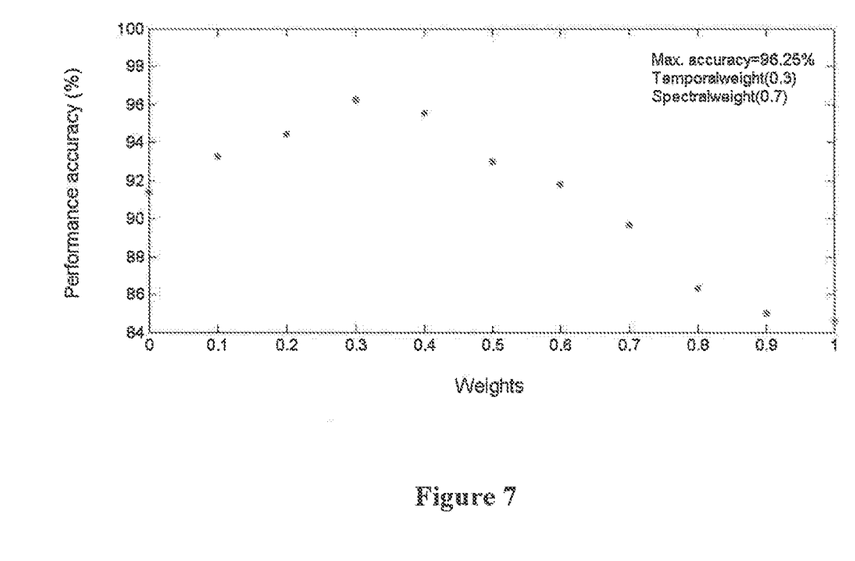
FIG. 7 illustrates classification performance of the combined system for various combinations of the weighting factors, in accordance with an embodiment of the present disclosure.

In Equation (4), $C^m$ is a confidence score, $W_i$ and $C_i$ are weighting factor and confidence score of $i^{th}$ modality, and m indicates number of modalities used for combining the scores. Two modalities are combined in the present disclosure: (1) SVM Model developed using spectral features and (2) SVM Model developed using time domain features. One of the weights ($W_i$) is varied in steps of 0.1 from 0 to 1, and the other weight is determined using the formula: $W_j = 1 - W_i$ such that total weight $W_i + W_j = 1$. Hence, 11 combinations of weighting factors are obtained. The classification performance of the combined system for various combinations of the weighting factors is shown in FIG. 7. It is observed that the best classification performance is about 96.25% for the weighting factors 0.7 and 0.3 for the confidence scores of spectral and time domain features based system for crowd noise classification respectively. Classification performance obtained after fusion of scores in terms of score fused performance matrix is shown in Table 4. This indicates that fusion is able to combine the complementary nature of evidence obtained from spectral and time domain features.

TABLE 4

| | Average classification performance (%) using score level fusion | |
|---|---|---|
| | Crowd | No crowd |
| Crowd | 94.30 | 5.70 |
| No Crowd | 1.80 | 98.20 |

According to the present disclosure, spectral and time domain features are used to discriminate the crowd noise. SVMs are used as classification models for developing different systems for crowd noise classification. The performance of the systems for crowd noise classification are developed by spectral and time domain features and are improved by exploring fusion techniques, by combining the features and scores of the individual systems. An improvement in classification performance of the system is observed at score level fusion with average classification performance of 96.25%. This is attributed to the complementary nature of evidence present in spectral and time domain features.

Figure 8:
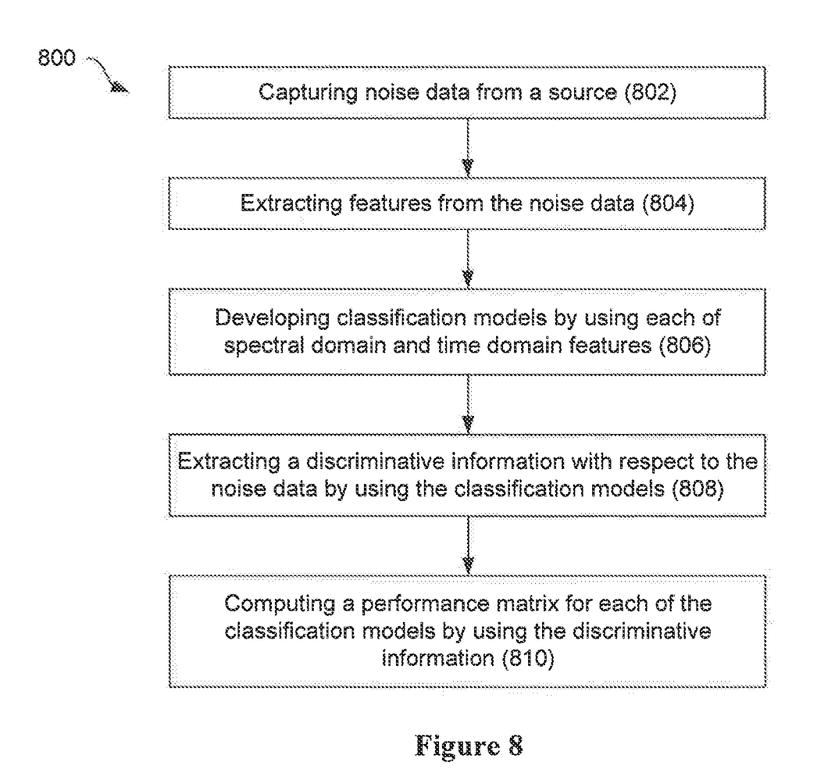
FIG. 8 illustrates a method to provide classification of noise data of human crowd is shown, in accordance with an embodiment of the present subject matter.

Referring to FIG. 8, the order in which the method 800 is described is not intended to be construed as a limitation, and any number of the described method blocks can be combined in any order to implement the method 800 or alternate methods. Additionally, individual blocks may be deleted from the method 800 without departing from the spirit and scope of the subject matter described herein. Furthermore, the method can be implemented in any suitable hardware, software, firmware, or combination thereof. However, for ease of explanation, in the embodiments described below, the method 800 may be considered to be implemented in the above described system 102.

According to an embodiment of the present disclosure, the method for crowd noise classification is provided. The method for crowd noise classification comprises collection and storage of crowd noise data in the database. By way of an example, the crowd noise data is collected mainly from the train terminus and book fairs. The method further comprises of preprocessing of the crowd noise data for removal of pauses and unwanted signals. The method further comprises feature extraction for examination of MFCCs and SFM for representing the spectral information and STE and ZCR for representing the time domain information.

The method further comprises SVM training for discriminating the crowd noise. SVM classification is a type of supervised learning. A classification task involves training and testing of data which consist of some data instances. In the training set, each instance contains one target class label and many attributes. The SVM classification is used to produce the model which predicts target class label of data instances in the testing set, given only the attributes. Hence for enhancing the performance of the method for crowd noise classification, the method further comprises using fusion techniques at feature and score levels. The score level fusion is performed by summing the weighted confidence scores (evidences). The fusion at feature level is performed by concatenation of the individual features i.e., spectral and time domain features.

At block 802, noise data is captured from one or more sources.

At block 804, features from the noise data are extracted using one or more computation techniques. The features comprise spectral domain features and time domain features.

At block 806, classification models are developed using the time domain features and the spectral domain features.

At block 808, discriminative information is extracted with respect to the noise data by using the classification models. The discriminative information recognizes the plurality of speech signals.

At block 810, a performance matrix is computed for each of the classification models by using the discriminative information. The performance matrix comprises one or more classified noise elements with respect to the noise data. Each classified noise element is associated with a classification performance score with respect to a spectral domain feature and a time domain feature. The classified noise elements provide categorization of the noise data thereby providing the classification of the noise data.

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

What is claimed is:

1. A method for classifying noise data of a human crowd, the method comprising:
    capturing the noise data from one or more sources, wherein the noise data is associated with a plurality of speech signals and wherein the noise data is captured using microphones of mobile phones;
    extracting features from the noise data by using one or more computation techniques, wherein the features comprise spectral domain features and time domain features;
    developing one or more classification models by using each of the spectral domain features and the time domain features, wherein the one or more classification models comprises one or more Support Vector Machines (SVM) classification models developed by using SVM learning technique, and wherein the one or more SVM models comprises SVM model using spectral domain features, SVM model using time domain features and SVM model using combination of the spectral domain features and the time domain features;
    extracting a discriminative information with respect to the noise data by using the classification models, wherein the discriminative information recognizes the plurality of speech signals and wherein the discriminative information comprise a change in an intensity level of the noise data;
    computing a performance matrix for each of the classification models by using the discriminative information, wherein the performance matrix comprises one or more classified noise elements with respect to the noise data, wherein each classified noise element is associated with a classification performance score with respect to a spectral domain feature and a time domain feature, and wherein the classified noise elements provide the classification of the noise data;
    fusing the classification performance score of the one or more classifying elements with respect to each of the spectral domain features and the time domain features based on a dynamic weighted rule to obtain fused scores, wherein the fusion results in multiple combinations of scores of the spectral domain features and the time domain features with respect to the one or more classifying elements; and
    computing a score fused performance matrix by using the fused scores and the discriminative information extracted using the SVM model based on the combination of the spectral domain features and the time domain features, wherein the score fused performance matrix comprises one or more classifying elements of the noise data with respect to the multiple combinations.

2. The method of claim 1, wherein the one or more sources comprises railway stations, book fairs or a combination thereof, and wherein the noise data is collected due to contribution of one or more events at the one or more sources, wherein the one or more event comprises at least one of a speech of people, a movement of people, announcements and horn sounds.

3. The method of claim 1, wherein the spectral domain features comprises Mel-Frequency Cepstral coefficients (MFCC) and Spectral Flatness Measures (SFM), and wherein the time domain features comprises Short Time Energy (STE) and Zero Cross Rate (ZCR).

4. The method of claim 3, wherein the STE and the ZCR are extracted by using amplitude of the noise data and zero-crossing rates of the noise data.

5. The method of claim 1, wherein the discriminative information is extracted by extracting feature vectors from the noise data.

6. The method of claim 1, wherein the one or more categorized noise element comprises no crowd noise data and crowd noise data, wherein the no crowd noise data comprises noise data where people are less than three, and wherein the crowd noise data comprises noise data where people are more than three.

7. The method of claim 1, wherein the method further comprising:
    fusing the spectral domain features and the time domain features to obtain a fused classification model.

8. The method of claim 7, wherein the method further comprising:
    extracting a discriminative information with respect to the one or more noise data by using the fused classification models, wherein the discriminative information recognizes the plurality of speech signals; and
    computing a fused features performance matrix for the fused classification model by using the discriminative information, wherein the fused features performance matrix comprises one or more classified noise elements with respect to the one or more noise data, wherein each classified noise element is associated with a classification performance score with respect to fusion of the spectral domain feature and the time domain feature, and wherein the classified noise elements provide categorization of the one or more noise data thereby providing the classification of the noise data.

9. A system for classifying noise data of a human crowd, the system comprising:
a processor; and
a memory coupled to the processor, wherein the processor is capable of executing a plurality of modules stored in the memory, and wherein the plurality of modules comprising:
a capturing module configured to capture the noise data from one or more sources, wherein the noise data is associated with a plurality of speech signals and wherein the noise data is captured using microphones of mobile phones;
a first extraction module configured to extract features from the noise data by using one or more computation techniques, wherein the features comprise spectral domain features and time domain features;
a development module configured to develop one or more classification models by using each of the spectral domain features and the time domain features, wherein the one or more classification models comprises one or more Support Vector Machines (SVM) classification models developed by using SVM learning technique, and wherein the one or more SVM models comprises SVM model using spectral domain features, SVM model using time domain features and SVM model using combination of the spectral domain features and the time domain features;
a second extraction module configured to extract a discriminative information with respect to the noise data by using the classification models, wherein the discriminative information recognizes the plurality of speech signals and wherein the discriminative information comprise a change in an intensity level of the noise data; and
a computation module configured to:
compute a performance matrix for each of the classification models by using the discriminative information, wherein the performance matrix comprises one or more classified noise elements with respect to the noise data, wherein each classified noise element is associated with a classification performance score with respect to a spectral domain feature and a time domain feature, and wherein the classified noise elements provide the classification of the noise data;
fuse the classification performance score of the one or more classifying elements with respect to each of the spectral domain features and the time domain features based on a dynamic weighted rule to obtain fused scores, wherein the fusion results in multiple combinations of scores of the spectral domain features and the time domain features with respect to the one or more classifying elements; and
compute a score fused performance matrix by using the fused scores and the discriminative information extracted using the SVM model based on the combination of the spectral domain features and the time domain features,
wherein the score fused performance matrix comprises one or more classifying elements of the noise data with respect to the multiple combinations.

10. The system of claim 9, wherein the development module is further configured to fuse the spectral domain features and the time domain features to obtain a fused classification model.

11. The system of claim 10, wherein the second extraction module is further configured to extract a discriminative information with respect to the one or more noise data by using the fused classification models, wherein the discriminative information recognizes the plurality of speech signals; wherein the computation module is further configured to compute a fused features performance matrix for the fused classification model by using the discriminative information, wherein the fused features performance matrix comprises one or more classified noise elements with respect to the one or more noise data, wherein each classified noise element is associated with a classification performance score with respect to fusion of the spectral domain feature and the time domain feature, and wherein the classified noise elements provides categorization of the one or more noise data thereby providing the classification of the noise data.

12. A non-transitory computer readable medium embodying a program executable in a computing device for classifying noise data of a human crowd, the program comprising:
a program code for capturing the noise data from one or more sources, wherein the noise data is associated with a plurality of speech signals and wherein the noise data is captured using microphones of mobile phones;
a program code for extracting features from the noise data by using one or more computation techniques, wherein the features comprise spectral domain features and time domain features;
a program code for developing one or more classification models by using each of the spectral domain features and the time domain features, wherein the one or more classification models comprises one or more Support Vector Machines (SVM) classification models developed by using SVM learning technique, and wherein the one or more SVM models comprises SVM model using spectral domain features, SVM model using time domain features and SVM model using combination of the spectral domain features and the time domain features;
a program code for extracting a discriminative information with respect to the noise data by using the classification models, wherein the discriminative information recognizes the plurality of speech signals and wherein the discriminative information comprise a change in an intensity level of the noise data;
a program code for computing a performance matrix for each of the classification models by using the discriminative information, wherein the performance matrix comprises one or more classified noise elements with respect to the noise data, wherein each classified noise element is associated with a classification performance score with respect to a spectral domain feature and a time domain feature, and wherein the classified noise elements provide categorization of the noise data thereby providing the classification of the noise data;
a program code for fusing the classification performance score of the one or more classifying elements with respect to each of the spectral domain features and the time domain features based on a dynamic weighted rule to obtain fused scores, wherein the fusion results in multiple combinations of scores of the spectral domain features and the time domain features with respect to the one or more classifying elements; and a program code for computing a score fused performance matrix by using the fused scores and the discriminative information extracted using the SVM model based on the combination of the spectral domain features and the time domain features, wherein the score fused performance matrix comprises one or more classifying elements of the noise data with respect to the multiple combinations.

* * * * *